(12) United States Patent
Molnár

(10) Patent No.: US 12,529,880 B2
(45) Date of Patent: Jan. 20, 2026

(54) APPARATUS FOR POSITIONING A MICROSCOPE SLIDE

(71) Applicant: 3DHISTECH KFT., Budapest (HU)

(72) Inventor: Béla Molnár, Budapest (HU)

(73) Assignee: 3DHISTECH KFT., Budapest (HU)

( * ) Notice: Subject to any disclaimer, the term of this patent is extended or adjusted under 35 U.S.C. 154(b) by 383 days.

(21) Appl. No.: 18/221,050

(22) Filed: Jul. 12, 2023

(65) Prior Publication Data

US 2023/0350183 A1  Nov. 2, 2023

Related U.S. Application Data

(63) Continuation-in-part of application No. PCT/HU2021/050017, filed on Feb. 26, 2021.

(51) Int. Cl.
*G02B 21/34* (2006.01)

(52) U.S. Cl.
CPC ..................... *G02B 21/34* (2013.01)

(58) Field of Classification Search
CPC .. G02B 21/34; G02B 21/26; G01N 35/00029; G01N 1/312; G01N 2035/00138; G01N 2035/00039
See application file for complete search history.

(56) References Cited

U.S. PATENT DOCUMENTS

| | | | |
|---|---|---|---|
| 2,522,416 | A | 9/1950 | Weiskopf |
| 6,474,386 | B2 | 11/2002 | Takahashi et al. |
| 6,796,353 | B2 | 9/2004 | Lang et al. |
| 2004/0251796 | A1 | 12/2004 | Wood |
| 2010/0040439 | A1 | 2/2010 | Temple et al. |
| 2012/0218400 | A1* | 8/2012 | Kurata ............... G02B 21/365 348/79 |
| 2014/0362436 | A1* | 12/2014 | Forget .................. G02B 21/26 359/391 |

FOREIGN PATENT DOCUMENTS

| | | | | |
|---|---|---|---|---|
| CN | 105353157 A | | 2/2016 | |
| JP | WO2006098442 A1 | | 9/2006 | |
| KR | 20100111432 A | * | 10/2010 | ............ G02B 21/34 |
| WO | 99/49295 A1 | | 9/1999 | |
| WO | 03/052386 A1 | | 6/2003 | |

* cited by examiner

*Primary Examiner* — Christopher Stanford
(74) *Attorney, Agent, or Firm* — Olson & Cepuritis, Ltd.

(57) ABSTRACT

Apparatus for positioning a microscope slide and comprising co-acting first and second clamping jaws attached to a robot arm and adapted to receive and carry a microscope slide.

11 Claims, 18 Drawing Sheets

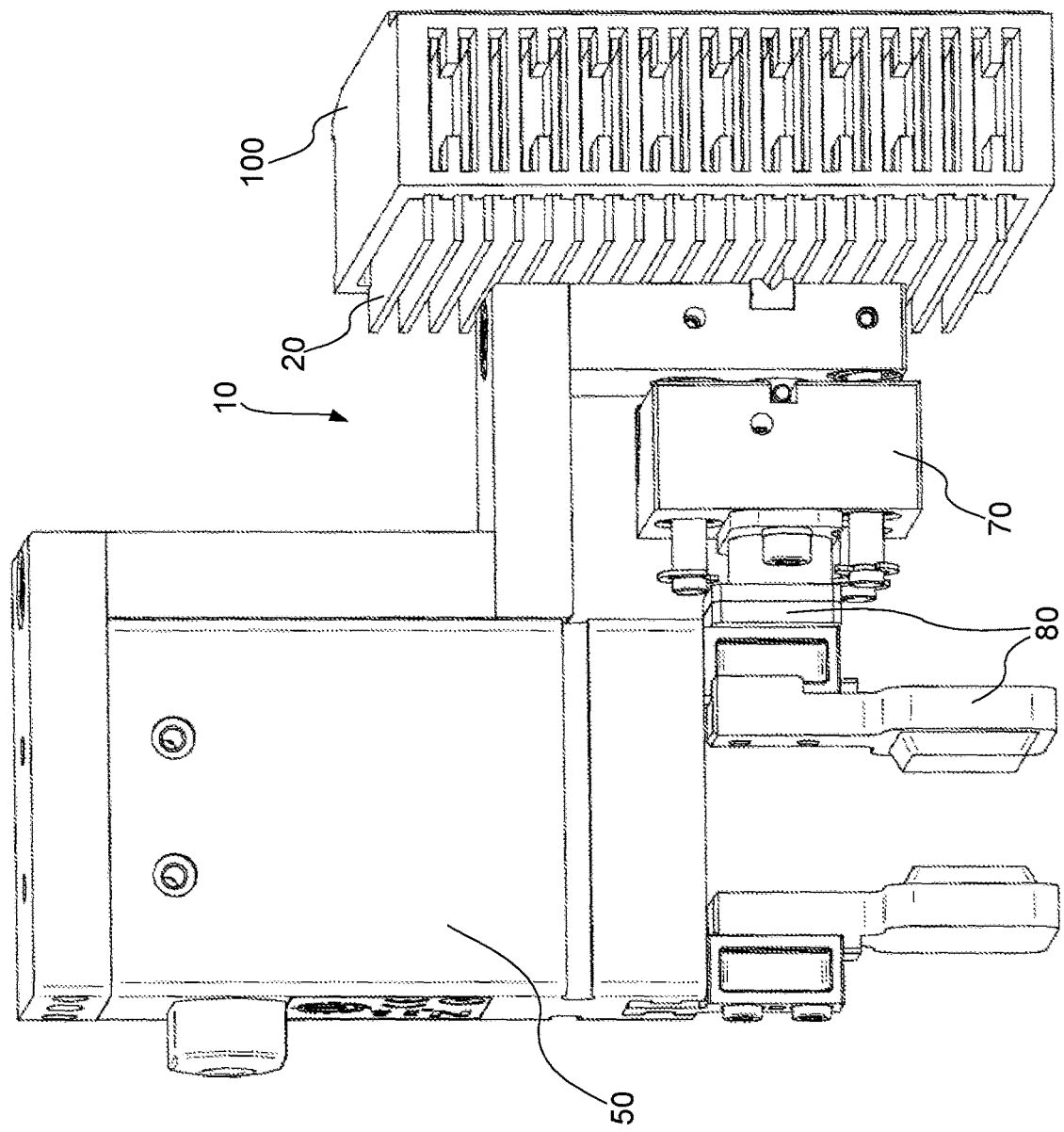

APPARATUS FOR POSITIONING A MICROSCOPE SLIDE

CROSS-REFERENCE TO RELATED APPLICATIONS

This application is a continuation-in-part of PCT/HU2021/050017, filed Feb. 26, 2021, which claims priority to Hungarian Application No. P2100013, filed Jan. 21, 2021, each of which is incorporated herein in its entirety.

FIELD OF INVENTION

The present invention relates to an apparatus for positioning a microscope slide.

BACKGROUND OF INVENTION

An important tool in pathological research is the examination of tissue samples placed on microscope slides with an optical microscope. Digital pathology, which has become widespread in recent decades, is a method in which glass slides are digitized using a scanner and then the resulting digital images are analyzed using computer programs.

As is known, to make visible of certain tissue structures requires the staining of the sample, and the covering of the samples is also required to improve mechanical protection and optical properties before microscopic examination of the stained samples. Furthermore, before and during staining, the sample placed on the slide is treated according to a given protocol, in which the so-called reagents are used in several successive steps, so that specific detection of certain molecules is possible. Treatment with reagents must take into account the incubation time and other parameters required to use the particular reagent, resulting in a very complex workflow and many potentials for error. In addition, some reagents are harmful to health, so several solutions have been developed to automate these workflows.

Patent document WO99/49295, discloses an automated device, so-called autostainer which, in addition to staining samples on slides, is also suitable for dispensing various reagents. Document WO03/052386 also shows an autostainer in which slides are placed horizontally next to each other and on the surface of which a manipulator head placed on a robot arm drips the required reagent.

In addition to autostainers, separate machines for covering the sample are also known, which place a glass cover plate on the sample after applying the coating material. Such, the so-called coverslipper machines are disclosed, for example, in patent documents U.S. Pat. No. 6,796,353 or U.S. Pat. No. 6,474,386.

There are also many examples in the literature of digital scanning microscopes—separate from staining and covering machines—for receiving and digitizing samples that have already been stained and covered.

The above devices are able to perform only some subtasks of the entire workflow of digital pathology, i.e., the steps of staining, covering, and digitization take place in different equipment. Slides containing the sample are usually transferred manually from one device to another with human intervention. In the machines, the slides are housed in slide holders, also known as slide racks, which allow multiple slides to be moved at the same time. In slide racks, however, ready-made slides wait until the rack is full. Thus, each piece of machine waits unused for a long time, and then it becomes necessary to process many slides at once. As a result, the various machines performing each function can become bottlenecks, which significantly prolongs the entire workflow. In addition, certain samples may tend to degrade in a shorter time. In these cases, it may be particularly important that the slide containing the sample be scanned in the shortest possible time.

It is therefore necessary to provide a slide positioning apparatus by means of which the slide in the rack can be removed from the rack, moved therefrom and, if appropriate, inserted into another rack, or by means of which the slide can be transferred to another device.

In slide racks typically used in digital pathology, slides are stacked on top of each other. In a first type of such racks (hereinafter referred to as a longitudinal rack), the slides are in contact with the rack along their longer edge and can be removed from there in a direction parallel to the longer edge. In this type, the ends of slides that do not contain a sample protrude slightly from the rack, and the slide can be moved by grasping this free end. U.S. Pat. No. 8,797,396 B2 discloses a digital microscope scanner system using this type of rack. The protruding end of the slides is gripped along the long edges on both sides using a robotic arm tweezers. The disadvantage of this solution is that it does not ensure a stable fixation of the slide, so that the slide can rotate in directions perpendicular to its surface.

In a known and frequently used second type of rack (hereinafter: transverse rack), slides can be removed from the rack in a direction parallel to their shorter edges. Such racks are used, for example, by Thermo Fisher's ClearVue™ machine. In this apparatus, a slide is pushed out of the rack in a direction parallel to its shorter side edges, in contact with its longer side edge, so that it is held against the other longer side edge of the slide by another arm. The sample is prepared in this position, at the end of which the slide is pushed back into the rack by the arms. It is easy to see that this mechanism is not suitable for removing the slide at any distance from the rack, as the pushing lever is trapped between the slides. Known slide handling devices are also not suitable for removing slides from such racks or moving slides therefrom. For example, the clip mechanism described in patent document U.S. Pat. No. 8,797,396 B2 cannot grip the slides in the absence of protruding parts. Mechanisms that grip the slide at the bottom and top surfaces are also not applicable to this type of rack, as when removed from the rack, the slide can easily rotate about an axis perpendicular to its surface, which can lead to positioning inaccuracies and errors in the workflow.

There is currently no slide positioning apparatus that can remove slides stored in transverse racks and move the removed slides in any direction.

We have also recognized that state of the art slide positioning devices are not suitable for stable gripping of slides, so that the slide can rotate in a direction perpendicular to its surface in the case of a clip mechanism and around an axis perpendicular to the slide surface in the case of a mechanism that grips the slide at the bottom and top surfaces, which can result in positioning inaccuracies during the workflow. A further disadvantage of the known slide positioning devices is that they are not able to transfer the slide to another slide positioning device, since each currently known positioning device grips the same free end of the slide protruding from the longitudinal rack.

In the transverse racks there are gaps of a few mm between the adjacent slides, through which a properly sized clamping jaw can be inserted, by means of which an opposite long side edge of the slide can be grasped, the slide pulled out of the rack and urged against another, co-acting clamping jaw. In this manner, the drawn slide can be stably secured between the clamping jaws, removed from the rack, and moved in any direction and desired location. By forming the co-acting clamping jaws as prismatic jaws, an exceptionally stable and self-positioning fixation of the slide can be achieved. By proper arrangement of the clamping jaws, a substantially 3-point mount can be created.

SUMMARY OF INVENTION

Apparatus for positioning a microscope slide is carried by a robot arm and utilizes co-acting first and second clamping jaws that are adapted to receive therebetween and carry a microscope slide. The first clamping jaw is fixed to a frame attached to the robot arm. A support rod carries the second clamping jaw, is slidably mounted to the robot arm, and is adapted for rotation and back-and-forth movement relative to the first clamping jaw. The second clamping jaw is mounted to a distal end portion of the support rod. A support rod drive is operably associated with the support rod and is carried by the robot arm.

BRIEF DESCRIPTION OF THE DRAWINGS

In the drawings,
FIG. 9d is a view illustrating the fourth phase of removing a slide from a transverse rack.

DESCRIPTION OF PREFERRED EMBODIMENTS

Figure 1:
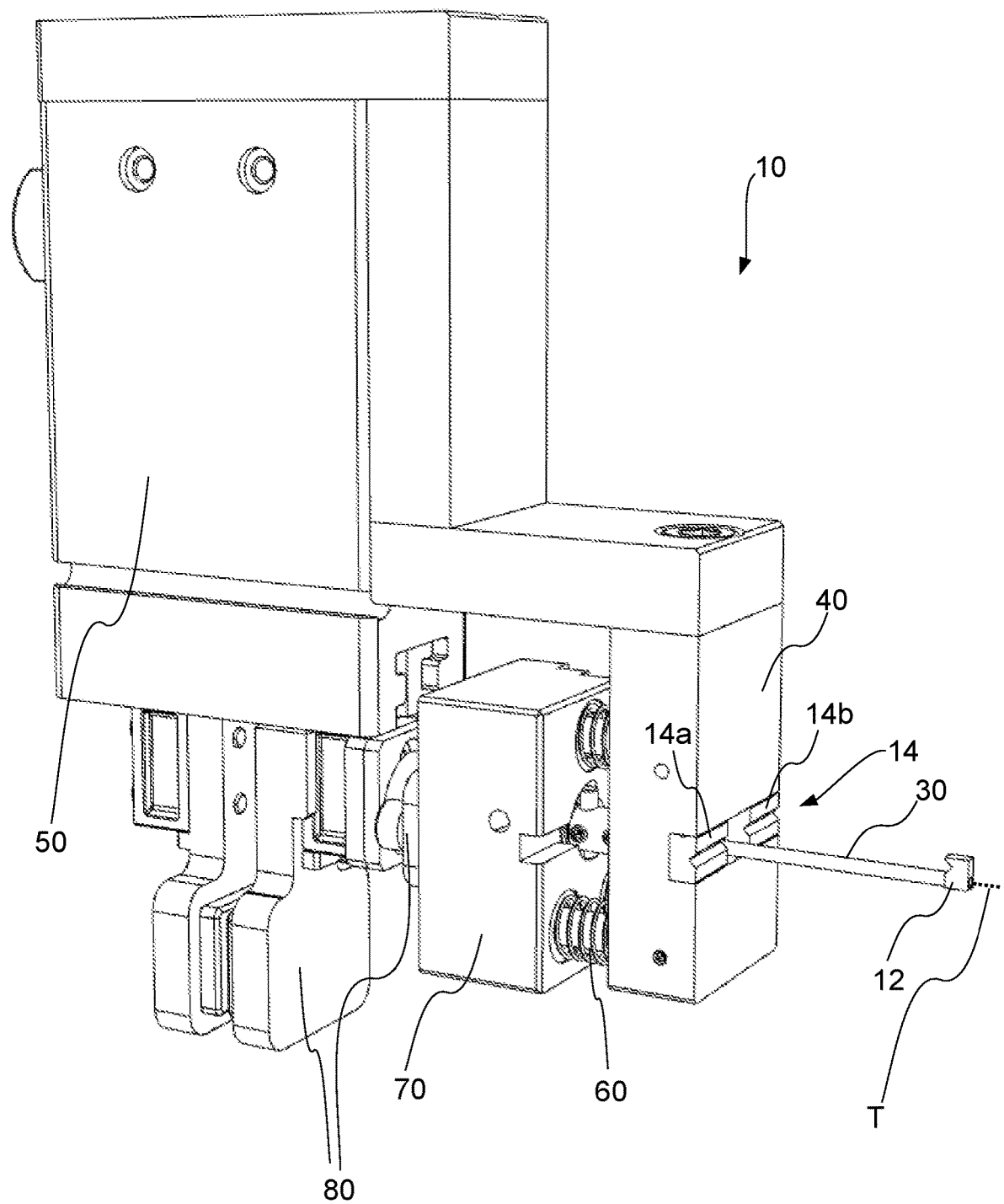
FIG. 1 is a schematic perspective view of an exemplary embodiment of an apparatus according to the invention.
Figure 2:
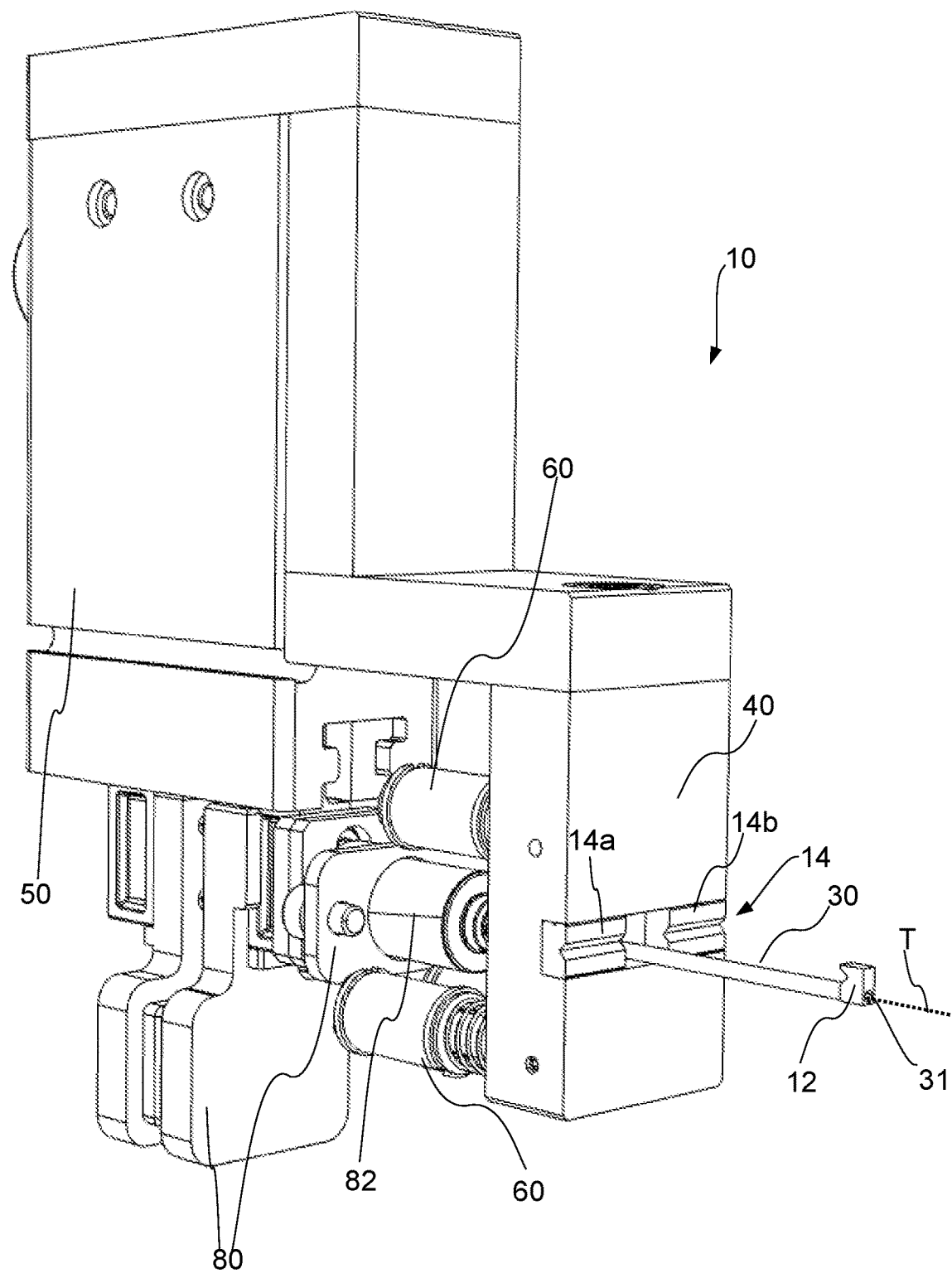
FIG. 2 is a view of the apparatus of FIG. 1 without a housing.
Figure 3:
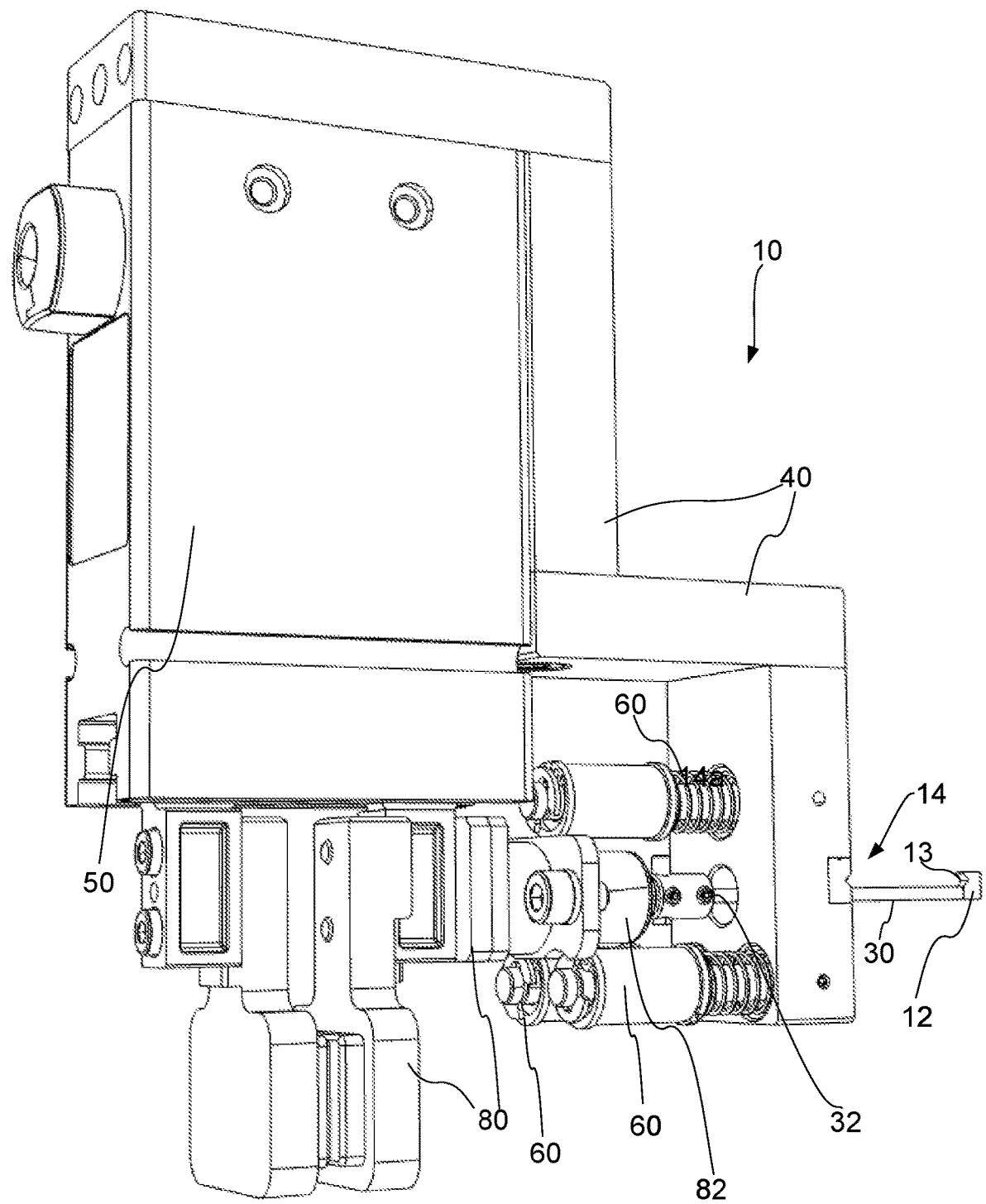
FIG. 3 is a schematic perspective view of the apparatus of FIG. 2 from another view.

Apparatus 10, as shown by the Figures, positions a microscope slide 20 as shown in FIGS. 9a-9i. In the context of the present invention, the term "positioning" includes removing the slide 20 from a rack 100, moving it away from the rack 100, or inserting the slide 20 into another rack or placing the slide 20 at a different location in the same rack 100. Rack 100 is a transverse slide rack as already described above, an exemplary embodiment of which is shown in FIGS. 9a-9i. The slide 20 is an elongated flat columnar plate, preferably made of glass, commonly used in digital pathology, bounded by opposite and parallel short edges 100a, long edges 100b, as well as lower and upper surfaces.

FIGS. 1 to 5 show an exemplary embodiment of the apparatus 10 attached to the robot arm 50. For the sake of clarity, only a part of the robot arm 50, in this case its manipulator head, is shown in the Figures. In the context of the present invention, the term robot arm 50 is to be construed broadly to include any mechanical system that is capable of moving in a predetermined path in a predetermined manner and performing tasks along the path, as is known to those skilled in the art. The robot arm 50 is suitable for carrying the apparatus 10. The apparatus 10 can be attached to the robot arm 50 in a known manner, for example by means of screws, bolts, clamps, and the like.

Figure 9A:
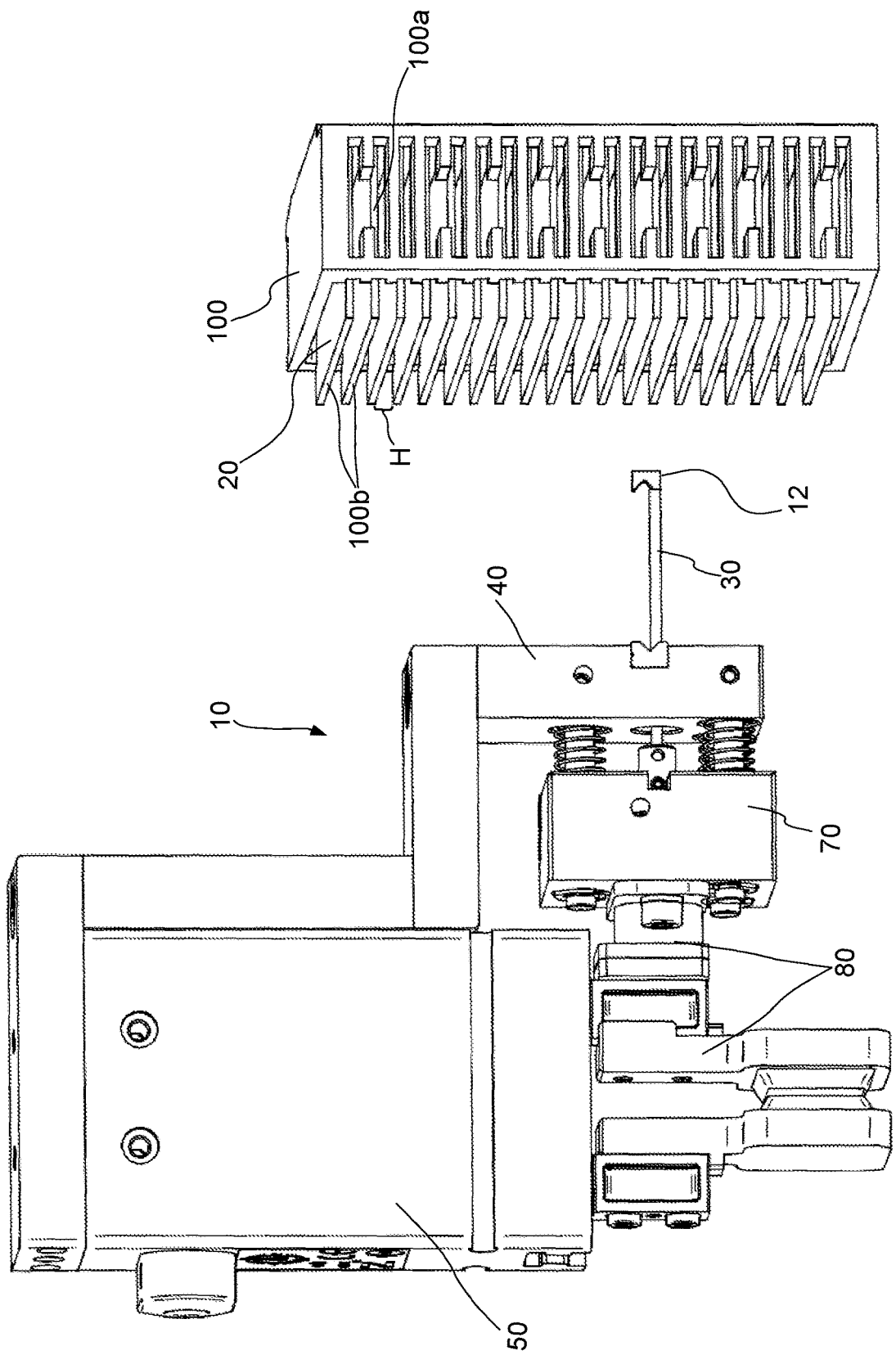
FIG. 9a is a view illustrating the first phase of removing a slide from a transverse rack.
Figure 9B:
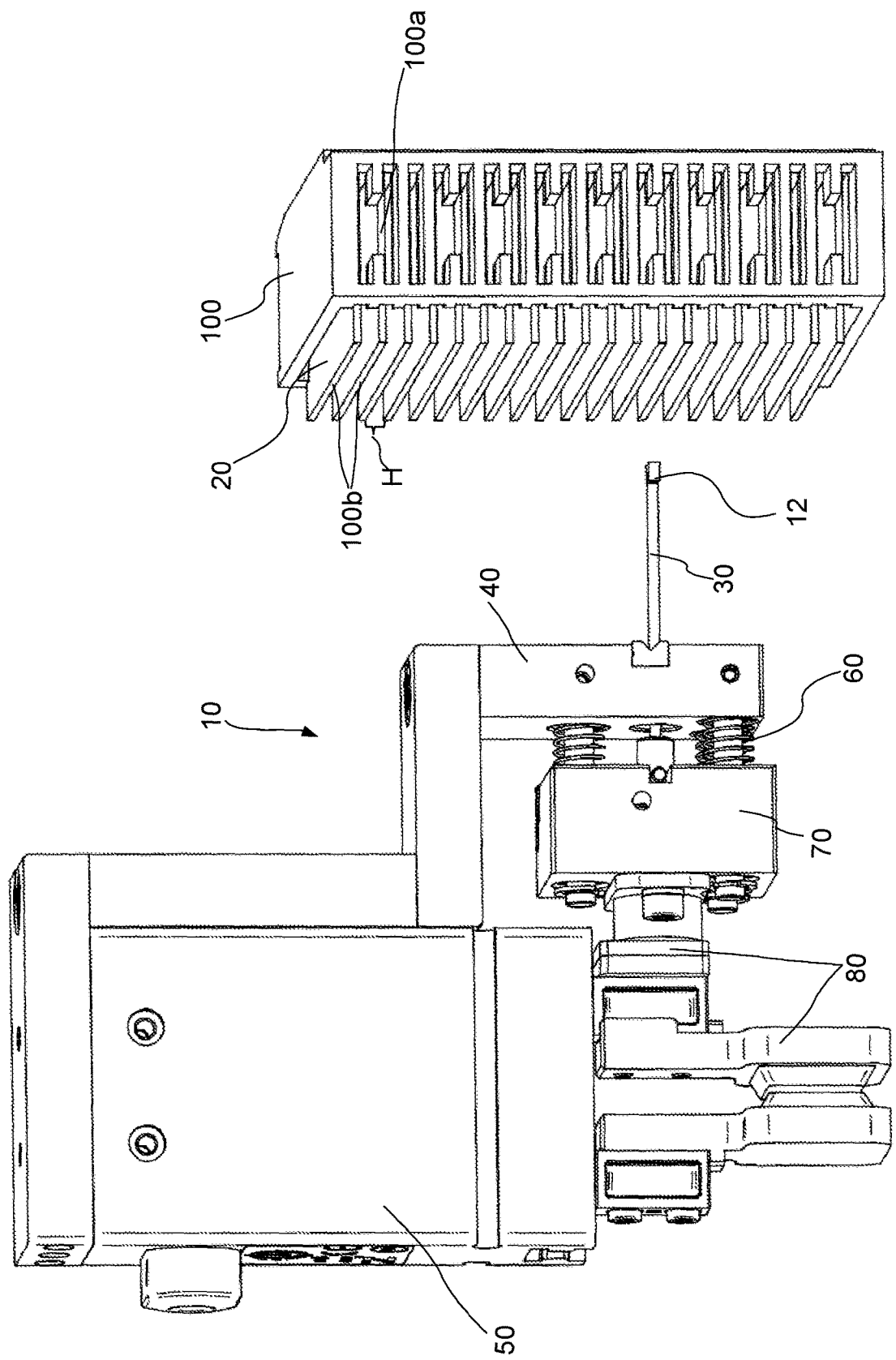
FIG. 9b is a view illustrating the second phase of removing a slide from a transverse rack.
Figure 9C:
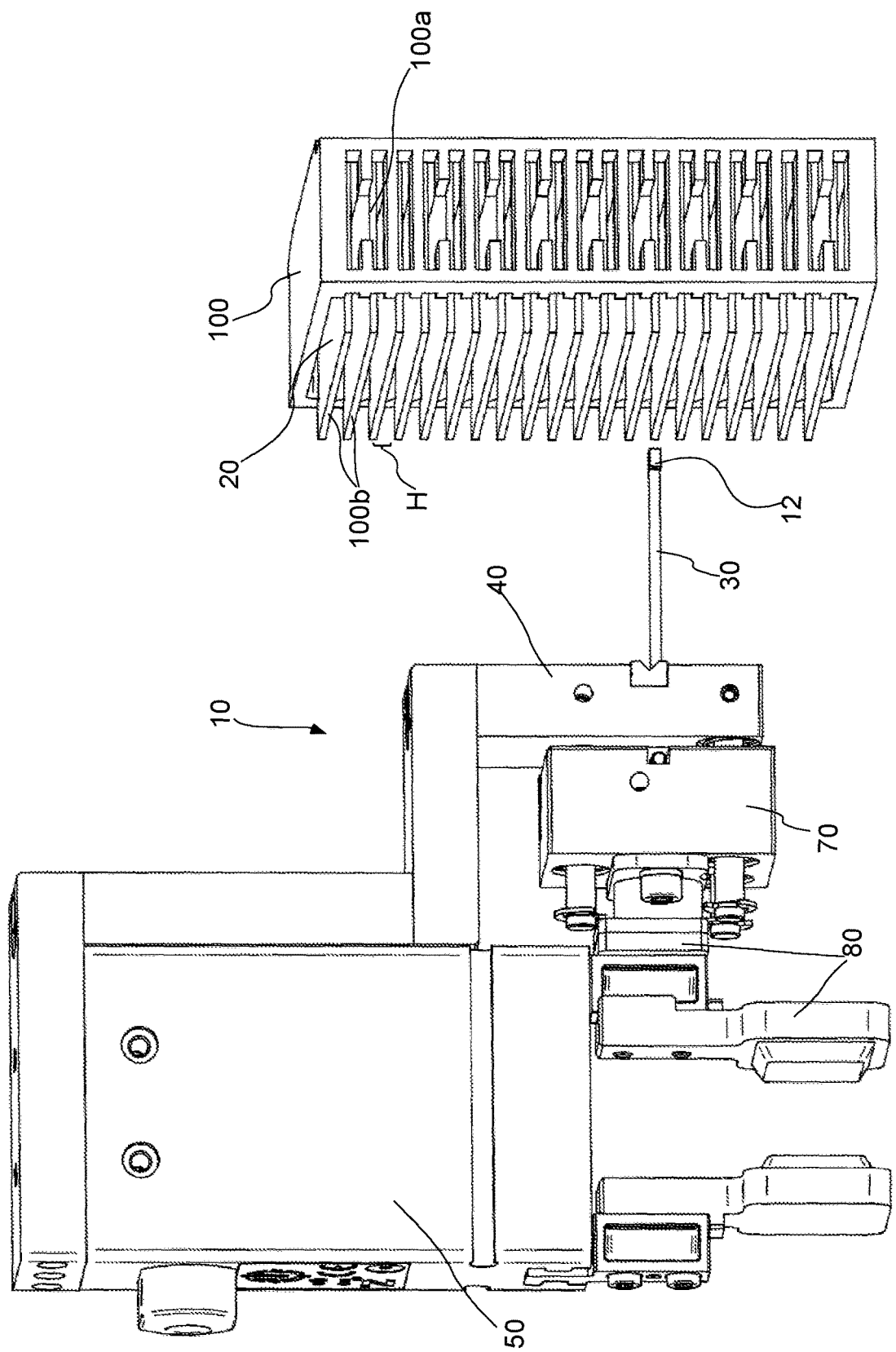
FIG. 9c is a view illustrating the third phase of removing a slide from a transverse rack.
Figure 9E:
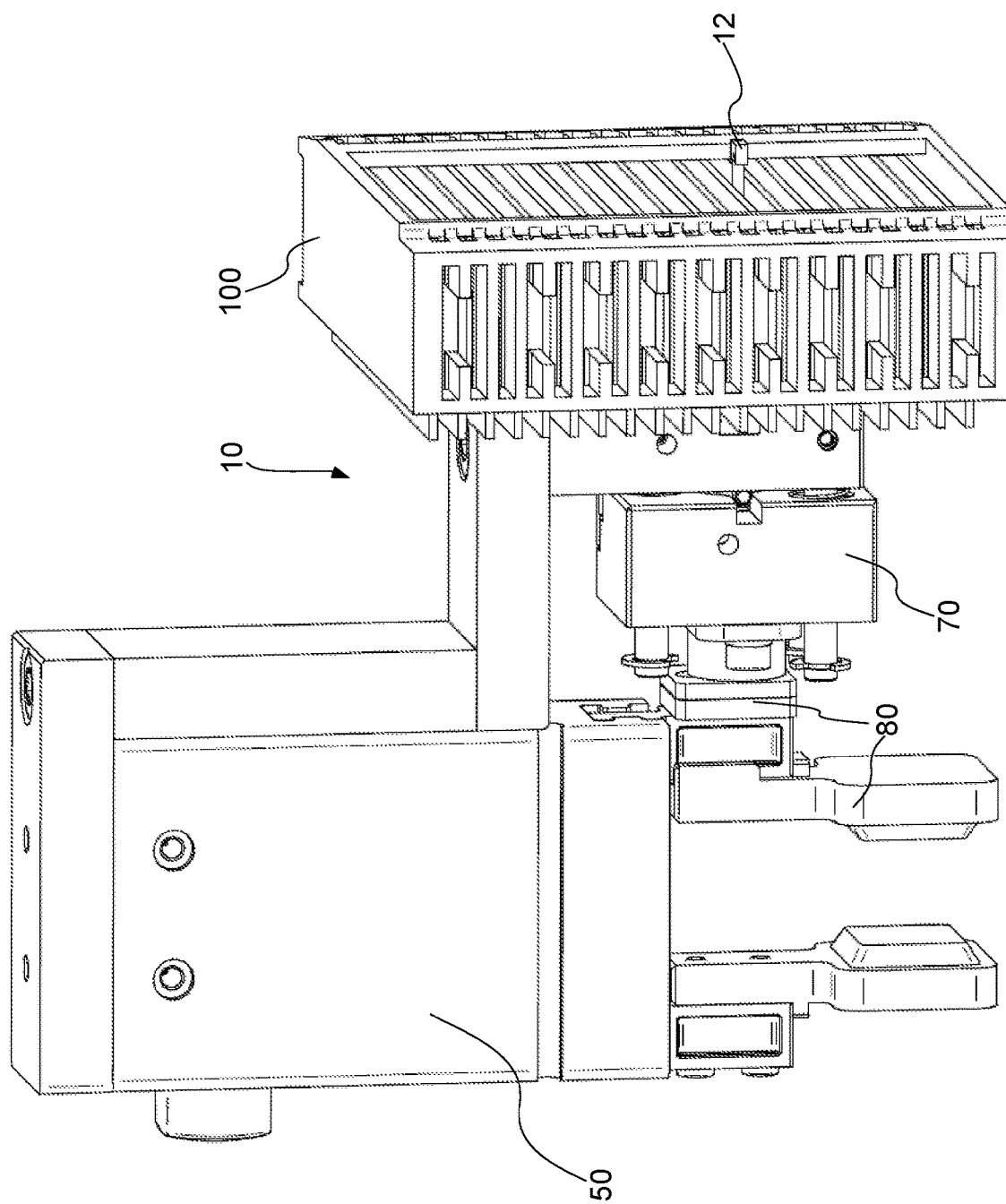
FIG. 9e is a view illustrating the fifth phase of removing a slide from a transverse rack.
Figure 9F:
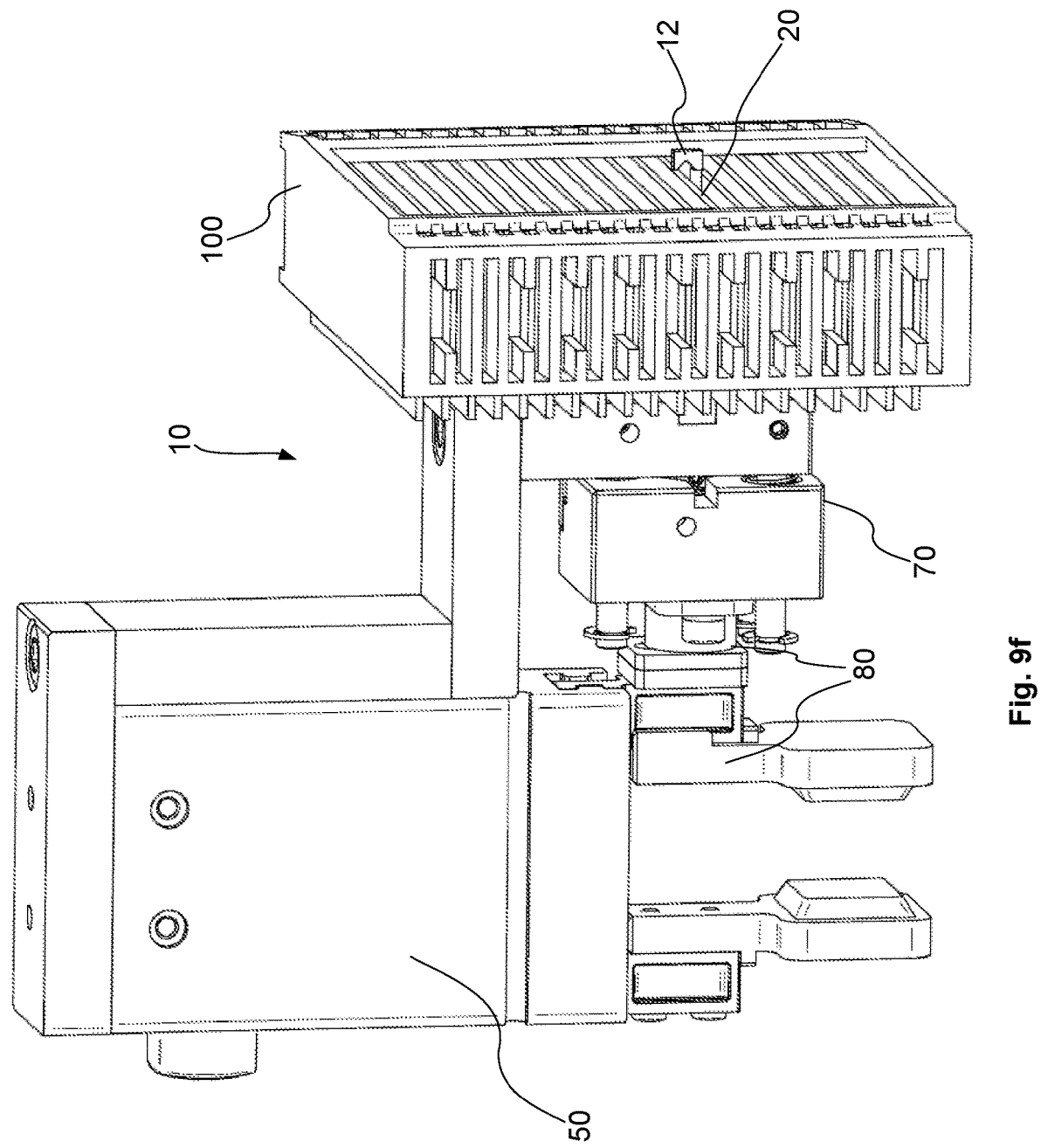
FIG. 9f is a view illustrating the sixth phase of removing a slide from a transverse rack.
Figure 9G:
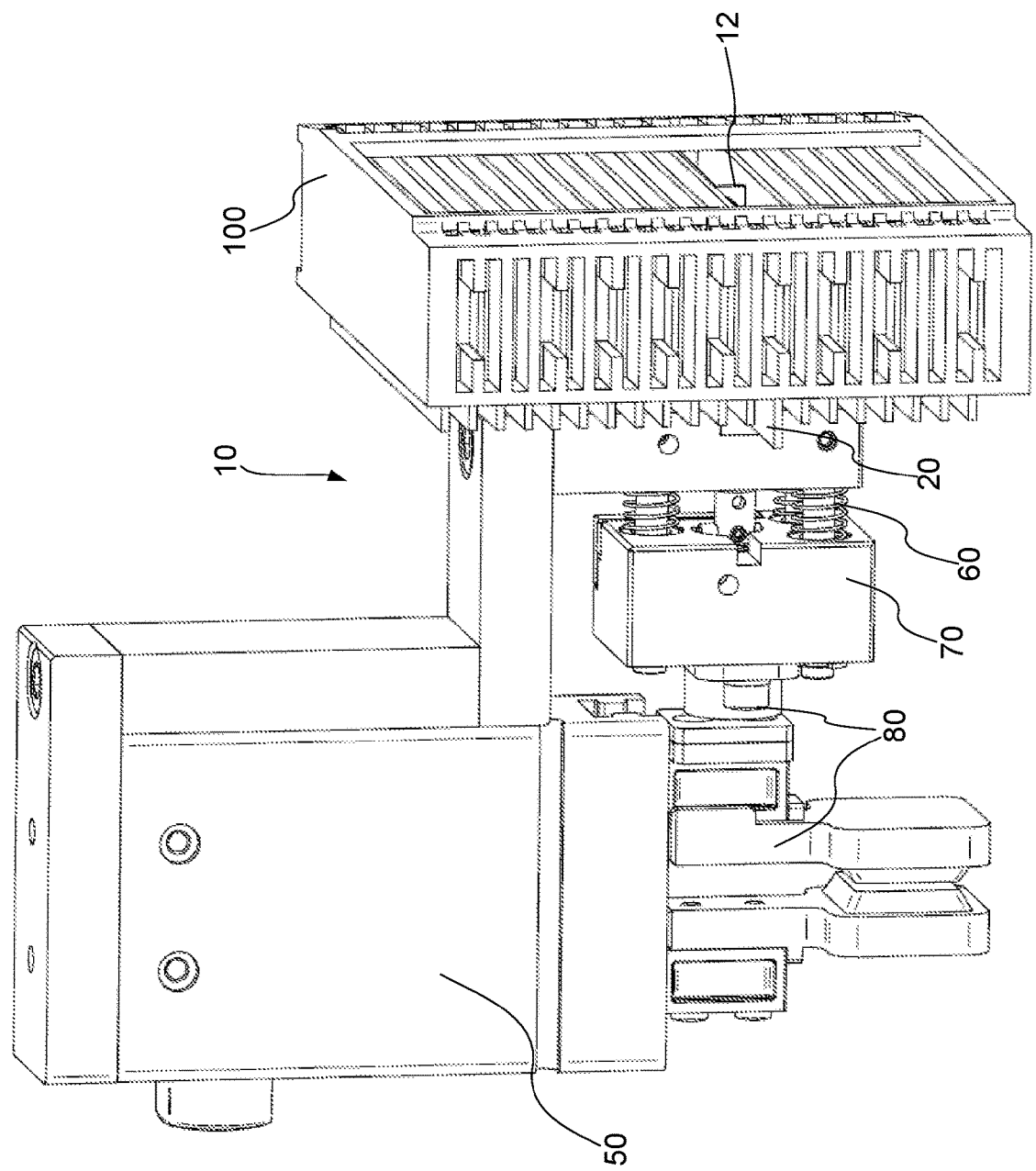
FIG. 9g is a view illustrating the seventh phase of removing a slide from a transverse rack.
Figure 9H:
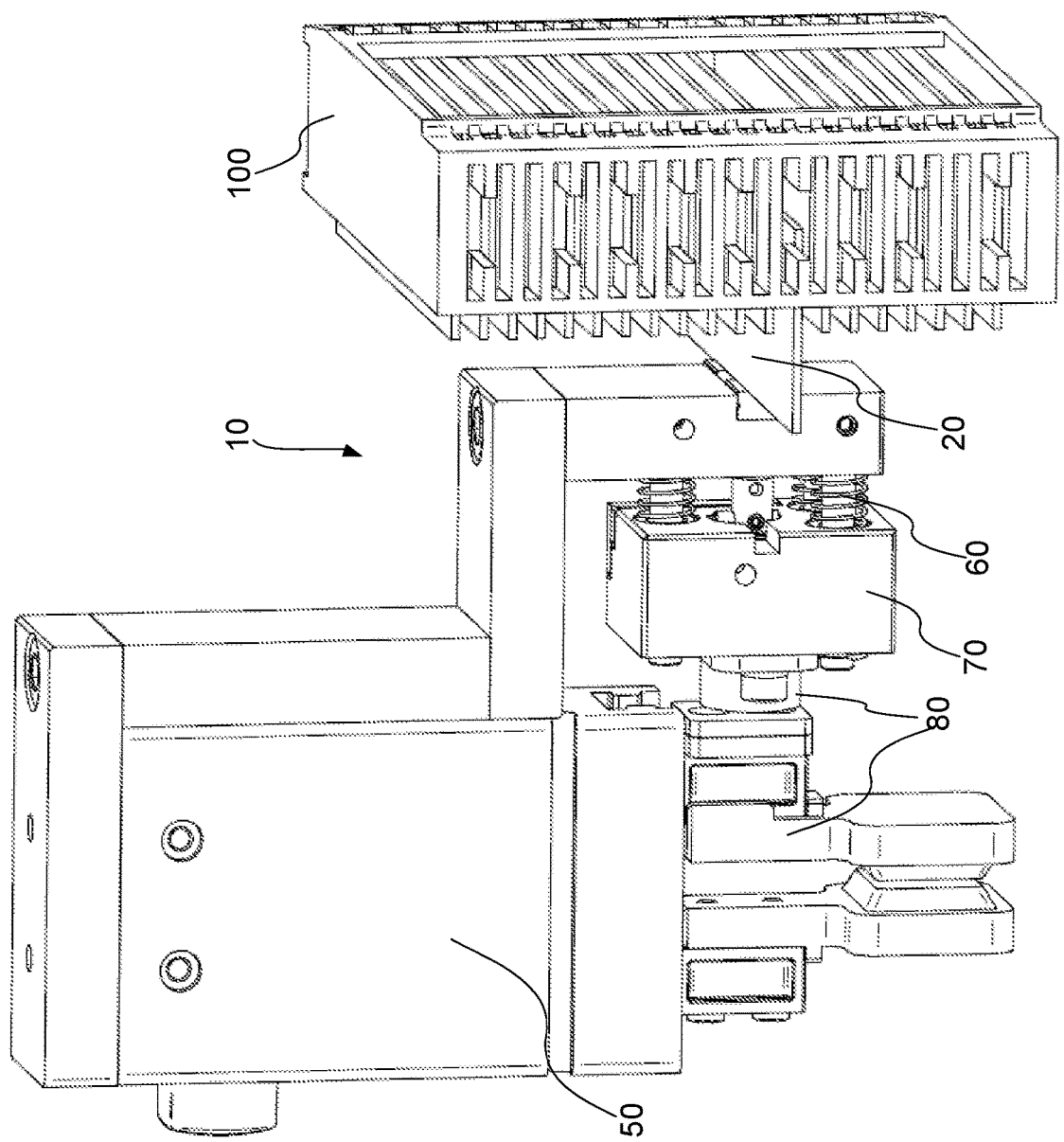
FIG. 9h is a view illustrating the eighth phase of removing a slide from a transverse rack.
Figure 9I:
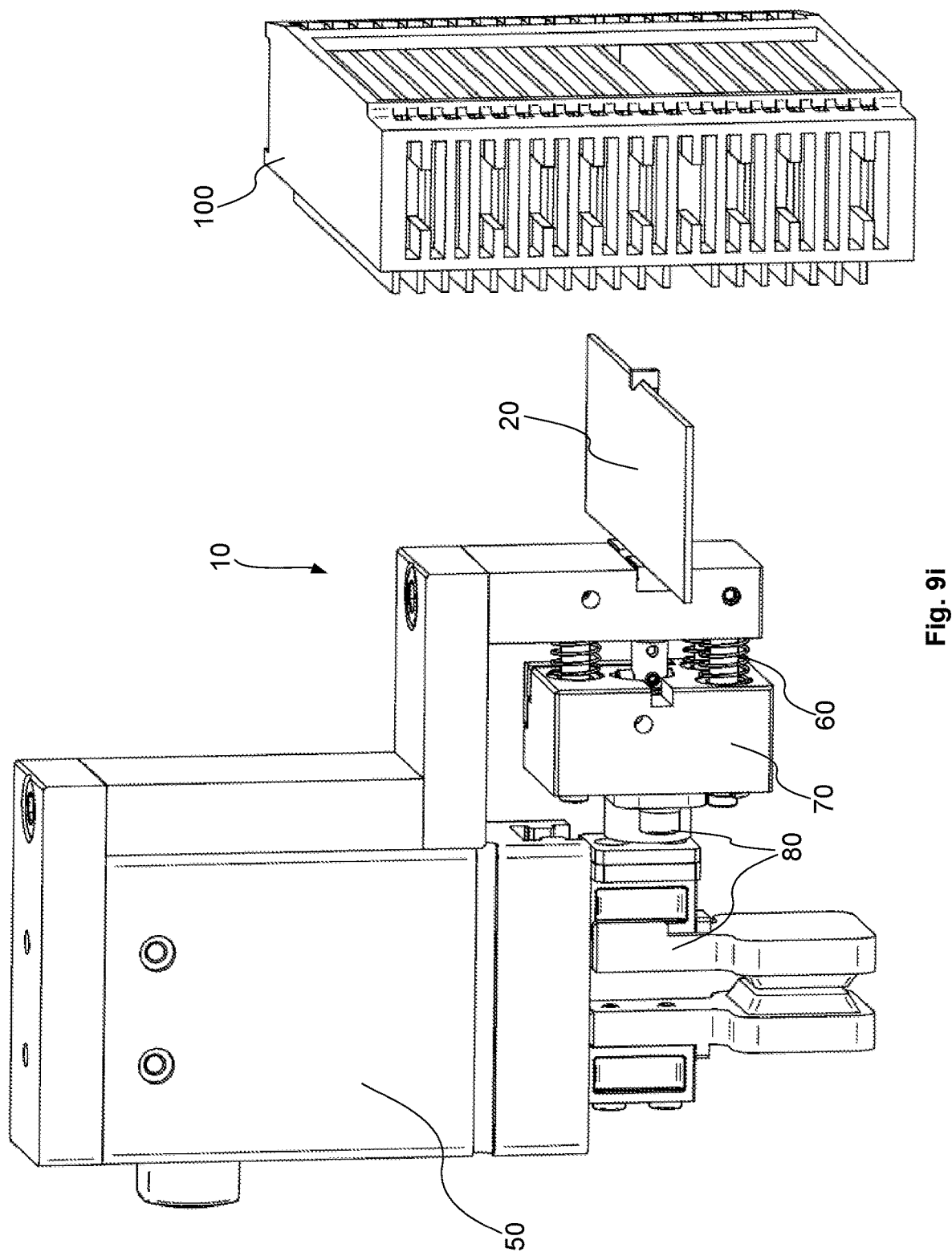
FIG. 9i is a view illustrating the ninth phase of removing a slide from a transverse rack.

The apparatus 10 is provided with co-acting first and second clamping jaws 12, 14 arranged opposite one another and are preferably formed as prismatic jaws with V-shaped, i.e. angled, legs. The angle enclosed by the legs of the prismatic jaws is preferably 90 degrees. It is also possible to use different angles, which are customary for prismatic jaws, as will be apparent to those skilled in the art. The prismatic jaws are sized so that their legs can engage long edges 100b of the slide as can be seen in FIG. 9a. The prismatic configurations of the clamping jaws 12, 14 are preferably made of a wear resistant hard metal, such as tungsten carbide, but, of course, the use of other metals or metal alloys (e.g. steel) is also conceivable, as will be apparent to those skilled in the art. In the embodiments shown in FIGS. 1 to 5, the legs of a given prismatic jaw meet a straight edge, i.e. the legs of the second clamping jaw 12 define a second prism edge 13 and the legs of the first clamping jaw 14 define a first prism edge 15. The prism edges 13, 15 are straight lines. It is noted that the prismatic jaws of the clamping jaws 12, 14 may optionally be formed so that the legs of the prismatic jaws do not actually meet (no such embodiment is shown in the figures), as is known to those skilled in the art. In this case, the prism edges 13, 15 are interpreted as an imaginary intersection line of the angled legs of the respective prism jaws.

In a particularly preferred embodiment, the first clamping jaw 14 is wider than the second clamping jaw 12, i.e. the length of the first prism edge 15 of the first clamping jaw 14 is longer than the length of the second prism edge 13 of the second clamping jaw 12. Clamping jaw 12 is formed in such a way that the length of the prism edge 13 is smaller than the distance H between the adjacent slides 20 in the rack 100, i.e. so that the clamping jaw 12 passes between the slides 20. The length of the second prism edge 13 of the second clamping jaw 12 is preferably 1-2 mm. The length of the first prism edge 15 of the first clamping jaw 14 is preferably 10-50 mm.

Figure 6A:
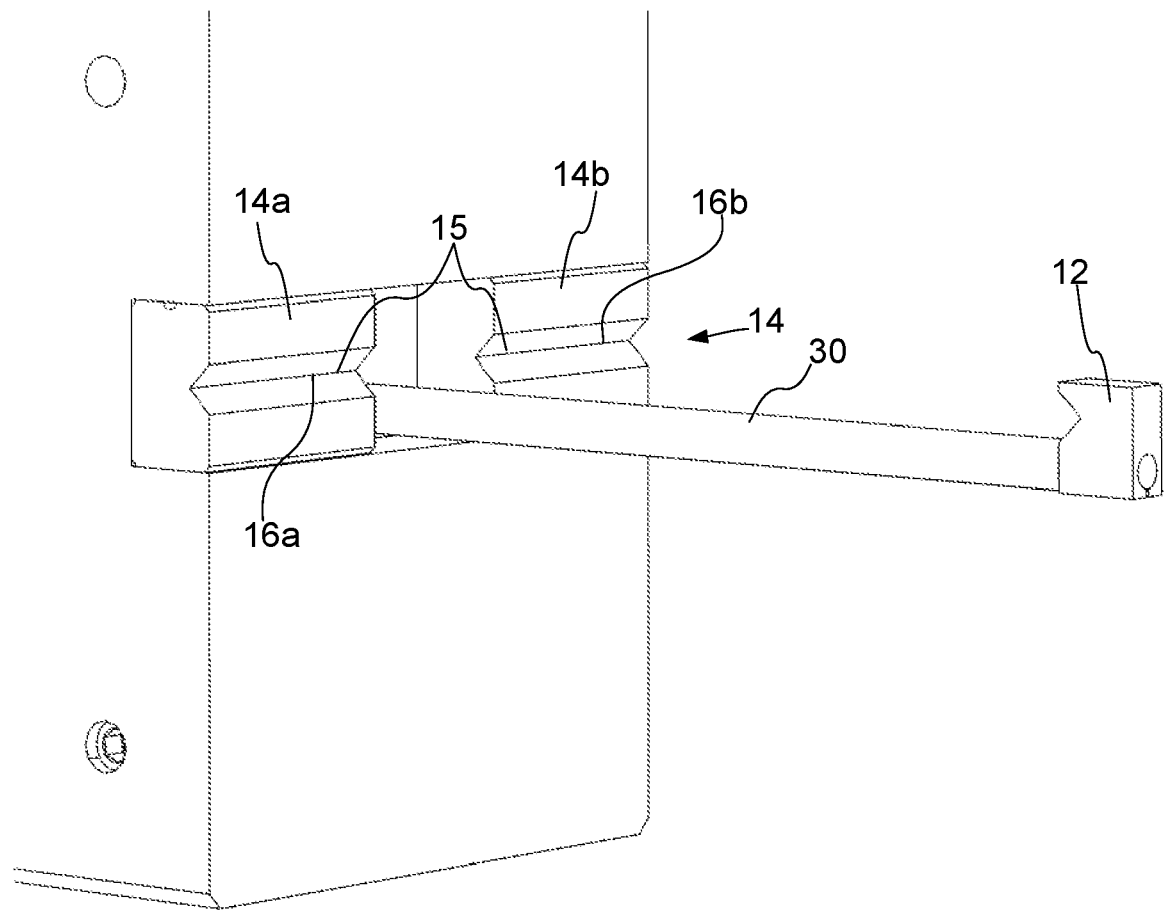
FIG. 6a is a schematic closer view an exemplary embodiment of the clamping jaws according to the invention, illustrating the first position of the first clamping jaw.
Figure 6B:
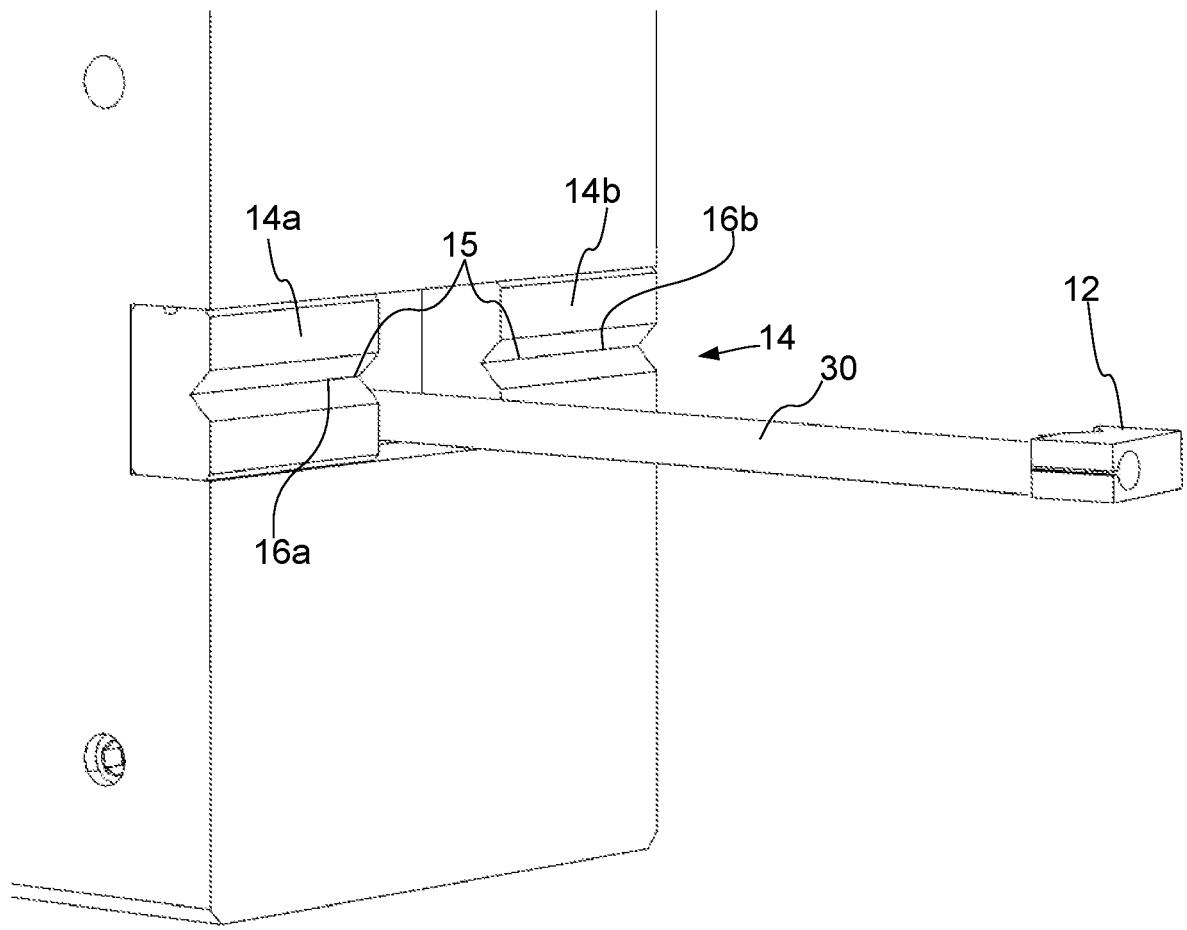
FIG. 6b is a schematic closer view of the clamping jaws of FIG. 6a, illustrating an exemplary second position of the first clamping jaw.
Figure 7:
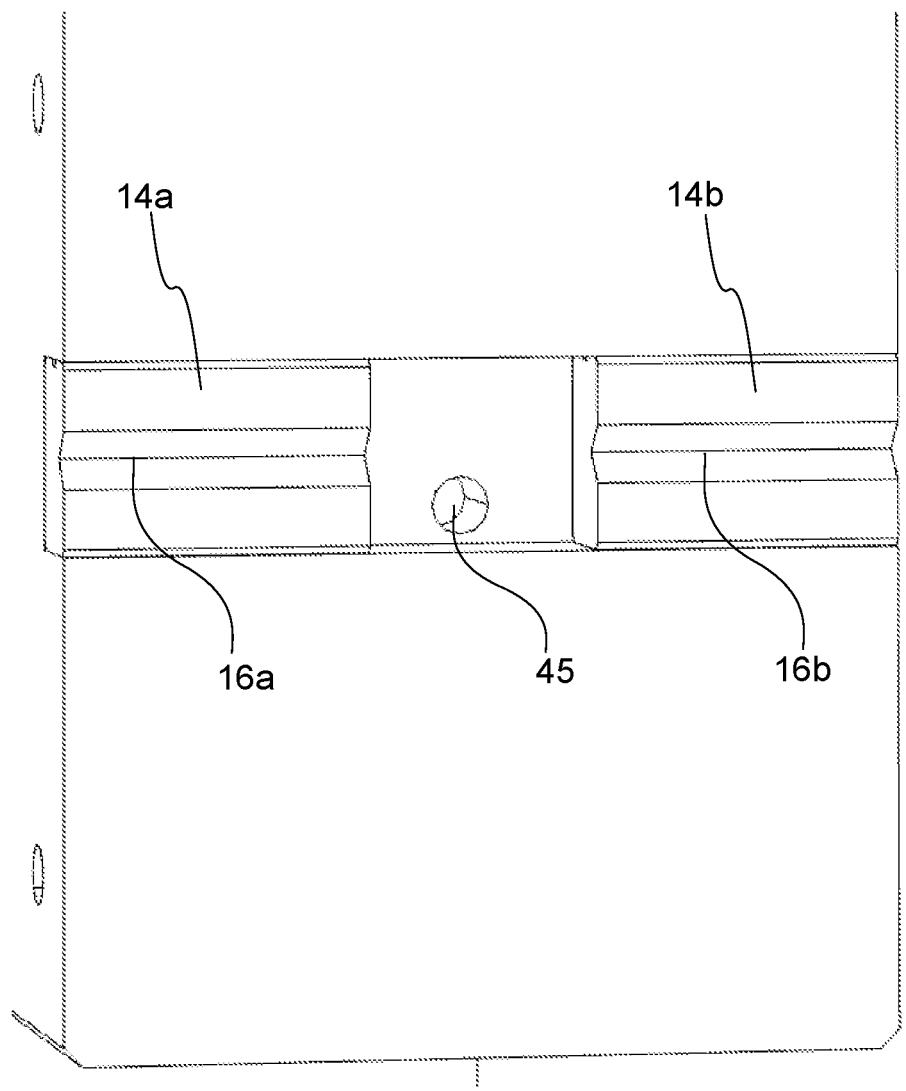
FIG. 7 is a schematic view illustrating a hole formed in the frame.

The first clamping jaw 14 defines an aperture 45 as can be seen in FIG. 7. The first clamping jaw 14 is fixed to a frame 40 carried by the robot arm 50 and can be a single piece or made up of several pieces. In the preferred embodiment shown in FIGS. 1 to 5, the first clamping jaw 14 comprises separate first and second clamping portions 14a, 14b, each of which is formed as a prismatic jaw with V-shaped legs. It is noted that the clamping jaw 14 may also be a single monolithic unit (not shown). If the clamping jaw 14 is made of hard metal, it is more expedient to make it in two pieces from a manufacturing point of view. FIGS. 6a, 6b show that the legs of the V-shaped prism jaws of the clamping portions 14a, 14b meet along a straight edge and define prism edge portions 16a, 16b, respectively. The length of each of the prism edge portions 16a, 16b is preferably at least 1.5 mm. Of course, the prismatic jaws of the clamping portions 14a, 14b can also formed in such a way that the legs of the prismatic jaws do not actually intersect (not shown in the figures). The prism edge portions 16a, 16b are then formed by the imaginary intersection lines of the angles of the respective prismatic jaws. If the clamping jaw 14 is formed by separate first and second clamping portions 14a, 14b, the length of the prism edge 15 of the first clamping jaw 14 is interpreted as the sum of the prism edge portions 16a, 16b of the two clamping portions 14a, 14b. In this embodiment, aperture 45 is provided between the clamping portions 14a, 14b to define a passageway for support rod 30 which carries second clamping jaw 12.

The second clamping jaw 12 of the device 10 according to the invention is fixed to a distal end portion 31 of support rod 30 which is slidably mounted to the robot arm 50 and extends through aperture 45. The support rod 30 also is adapted for rotation and back-and-forth movement relative to the first clamping jaw 14. The support rod 30 is rotatable about a longitudinal axis T between a first position and a second position, as can be seen, for example, in FIGS. 6a, 6b. The support rod 30 is rigid in design and preferably is also made of a hard metal such as tungsten carbide. The support rod 30 is preferably of circular cross-section, the diameter of which is preferably not greater than the length of the second prism edge 13. In the first position of the support rod 30 shown in FIG. 6a, the prismatic jaws of the clamping jaws 12, 14 face each other, so that no torque is exerted to the damped slide 20. In the first position, the prism edges 13, 15 of each prismatic jaw are straight lines parallel to each other in a plane parallel to the longitudinal axis T of the support rod 30. In other words, the imaginary surface connecting the prism edges 13, 15 is a plane parallel to the longitudinal axis T. The longitudinal axis T is preferably perpendicular to the prism edges 13, 15. When the device 10 is in use, the prism edge 13 of the clamping jaw 12 in the first position is horizontal.

In the second position shown in FIG. 6b, the support rod 30 has been rotated about 90 degrees relative to the first position, i.e. the orientations of the clamping jaw 12 in the first and second positions are perpendicular to each other. An angular difference of less than 90 degrees between the first and second positions is also feasible as long as clamping jaw 12 can pass through the rack of slides. The width of the clamping jaw 12, i.e. the length of the prism edge 13 and the second position, must be chosen so that the clamping jaw 12 fits between two adjacent slides 20 one above the other in the rack 100.

The rigid frame 40 is preferably made of metal, by means of which the apparatus 10 can be attached to the robot arm 50. The frame 40 may be formed from a single piece or, optionally, from several pieces. The first clamping jaw 14 is fixed to frame 40, and support rod 30 passes a passageway defined in frame 40 (not shown). The aperture 45 shown in FIG. 7 is aligned with the passageway in frame 40. As previously mentioned, it is expedient to form the clamping jaw 14 from clamping portions 14a, 14b, so that it is not necessary to drill a hole through the solid clamping jaw 14 itself, which is particularly advantageous from a technical point of view when using hard metal.

The apparatus 10 according to the invention includes a support rod drive carried by the robot arm 50 and operably associated with the support rod 30. In a preferred embodiment shown in FIGS. 1 to 5, the support rod drive comprises a displacer 80 for displacing the support rod 30 along the longitudinal axis T and a rotator 82 for rotating the support rod 30 about the longitudinal axis T. The rotator 82 is an electric motor fixed to the proximal end portion 32 of the support rod 30, adapted to rotate the support rod 30 at a predetermined angle and to hold it at that angle. Such a motor can be, for example, an electric stepper motor known per se, a DC servomotor, etc., as is known to the person skilled in the art. In this embodiment, the rotator 82 and the support rod 30 connected thereto form a co-moving system which is resiliently connected to the frame 40 via resilient elements 60. In other words, the support rod 30 according to the invention is slidably mounted to the robot arm 50 and adapted to move along its longitudinal axis T in a first direction P in which the clamping jaw 12 approaches towards the clamping jaw 14, and in a second direction D in which the clamping jaw 12 moves away from the clamping jaw 14. In a particularly preferred embodiment, the one or more resilient elements 60 are spring members adapted to move the support rod 30 in the first direction P. The one or more resilient elements 60 exert a force in the P direction on the support rod 30, the magnitude of which can be adjusted to the desired value by appropriate design of the resilient element 60. In this way, the clamping jaws 12, 14 grip the slide 20 with a constant and optimal force. The embodiment shown in the Figures comprises three resilient elements 60 in the form of coil springs, one end of which is attached to the frame 40 and the other end within housing 70. As will be seen later, housing 70 receives a proximal end portion 32 opposite the distal end portion 31 of the support rod 30, so that the resilient elements 60 can exert a force on the support rod 30 through housing 70. Rotator 82 is attached to displacer 80. The housing 70 has been removed from FIGS. 3 and 5 so that the arrangement of the coil springs and rotator 82 can be well observed. Instead of coil springs, other elastic elements, e.g. rubber disk, rubber band, elastic sponge, etc. can also be used as a resilient element 60, as will be apparent to those skilled in the art.

Figure 4:
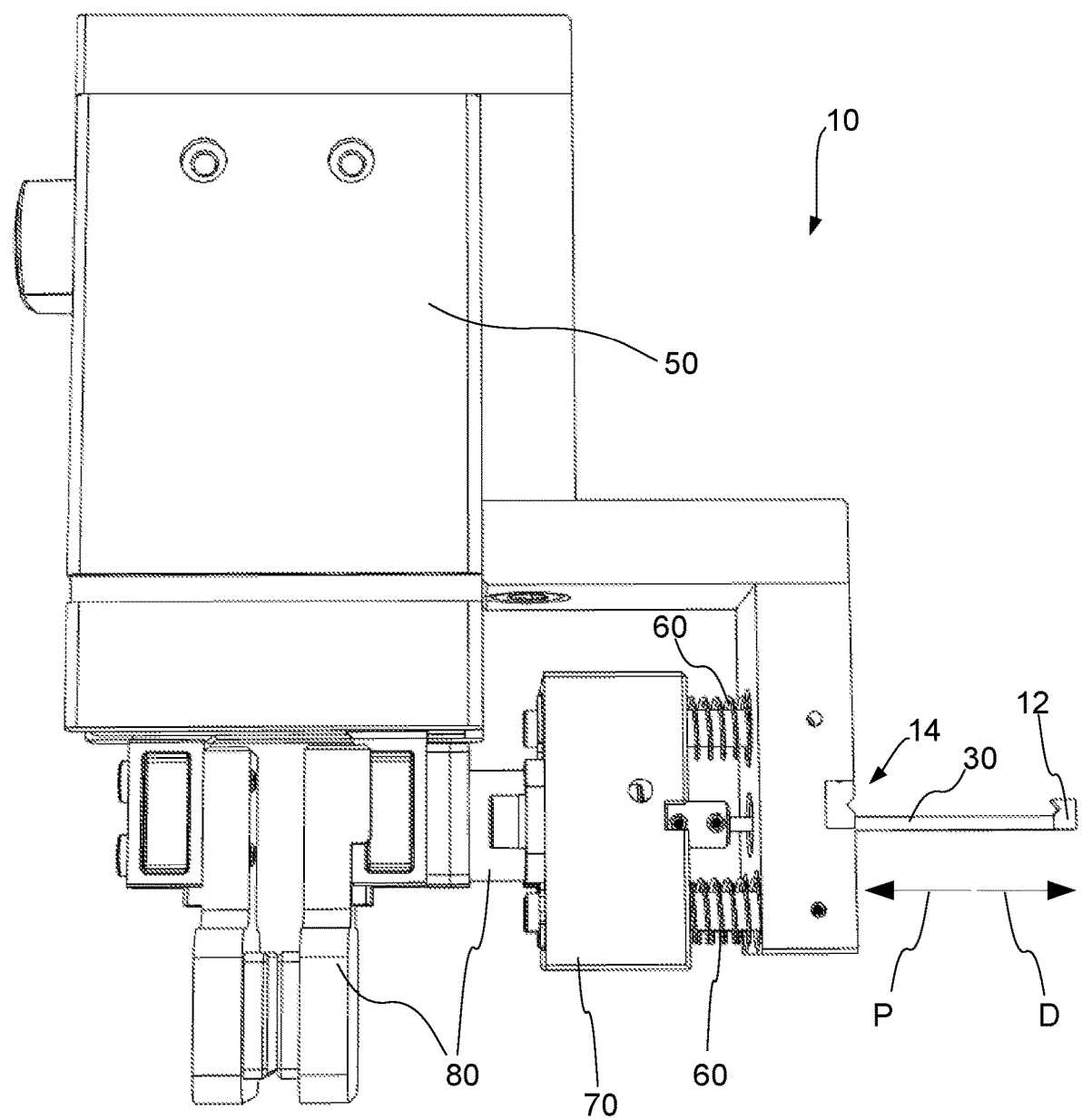
FIG. 4 is a schematic side view of the apparatus of FIG. 1.
Figure 5:
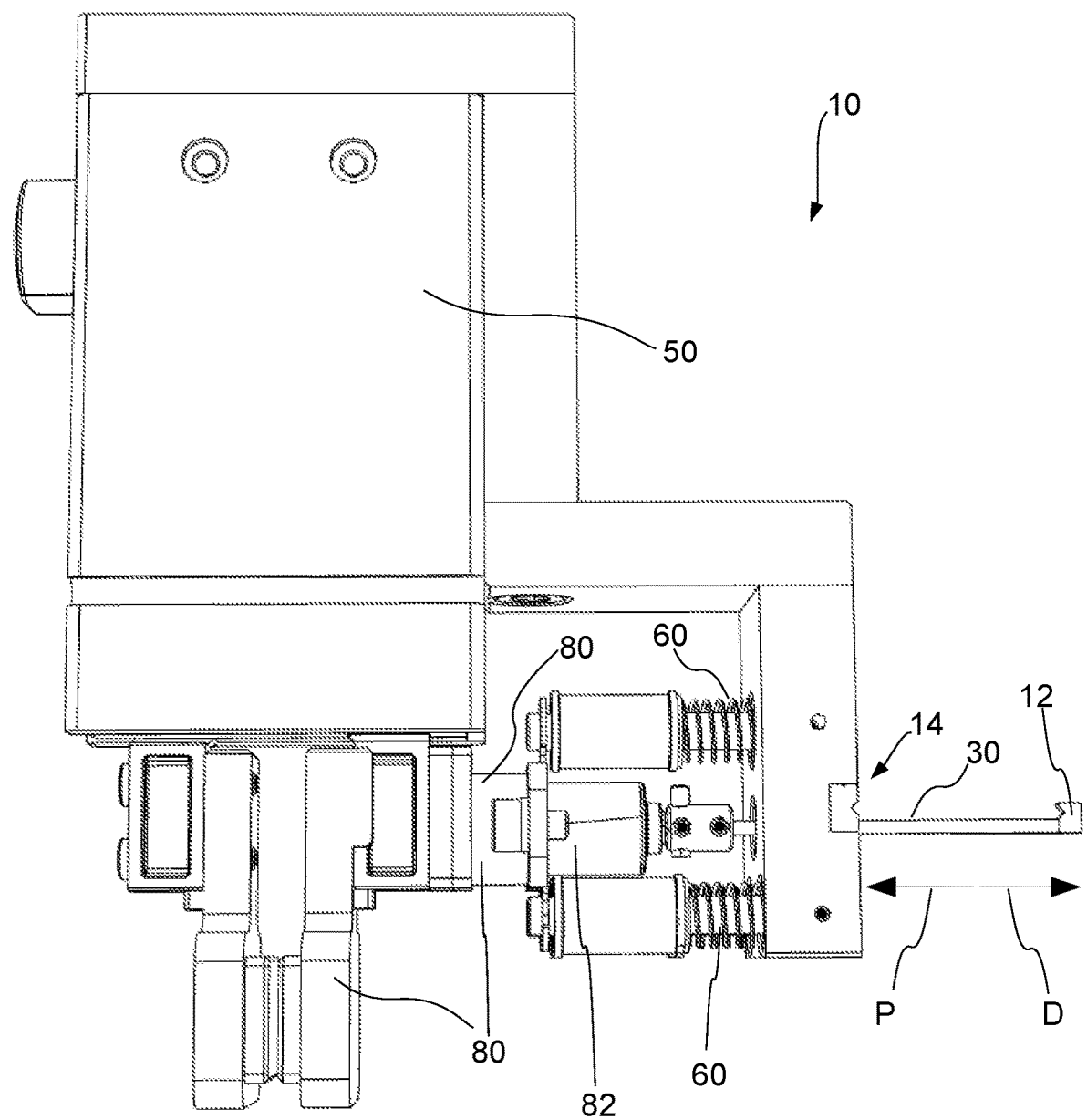
FIG. 5 is a schematic side view of the apparatus of FIG. 2.
Figure 8:
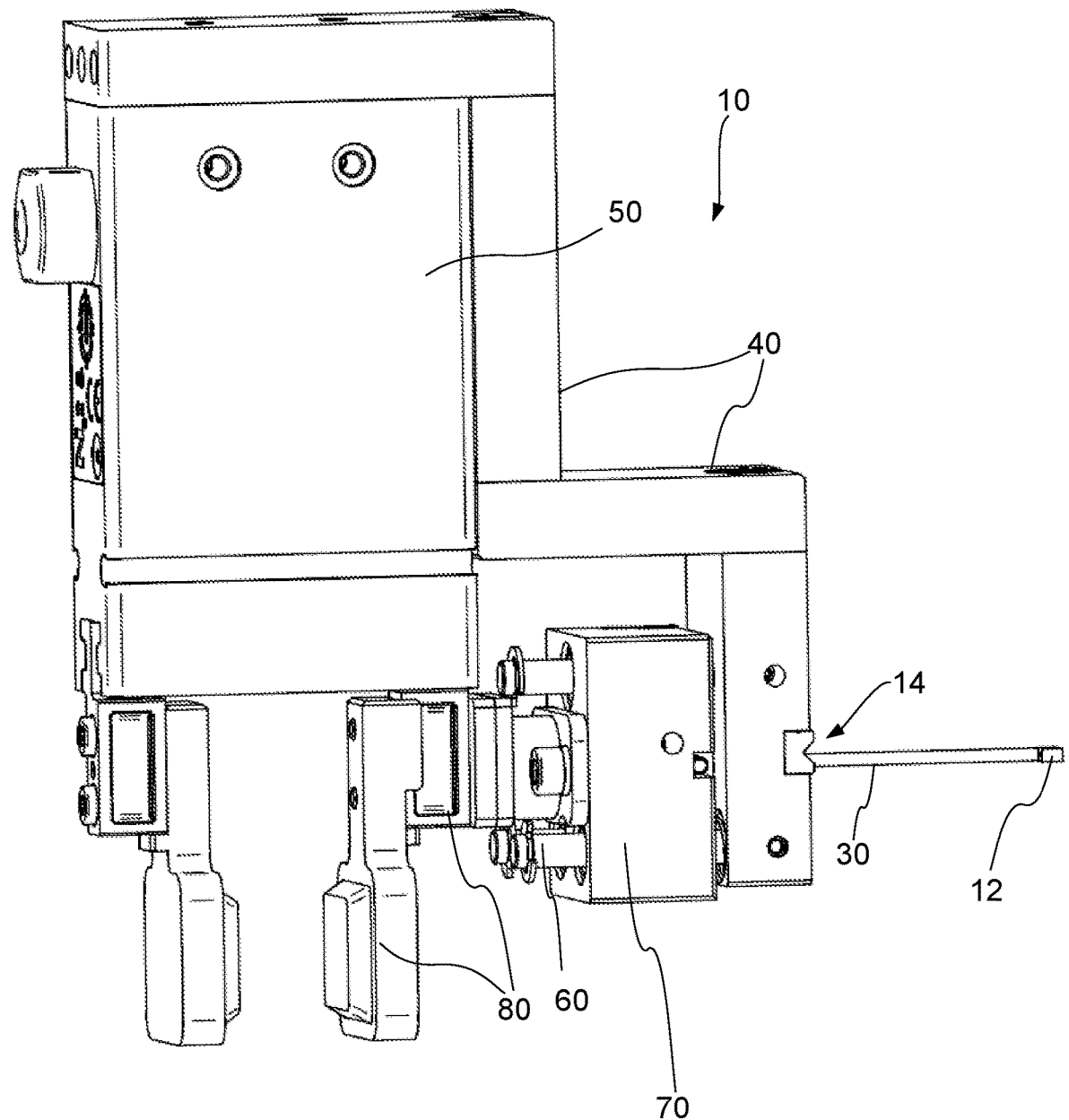
FIG. 8 is a schematic view illustrating the longitudinal displacement of the support rod of an exemplary device according to the invention by means of a displacer.

The displacer 80 (FIGS. 3 and 4) can be any means suitable for linear movement, for example a rail moving device guided by a rail track on robot arm 50. The transmission can be, for example, a rack, spindle, or belt drive, as will be apparent to those skilled in the art. In the preferred embodiment shown in FIGS. 1 to 5, the device 10 is attached to the robot arm 50 and the displacer 80 is slidably connected to the robot arm 50. As shown in FIG. 4, displacer 80 is arranged immediately adjacent the housing 70 so that the housing 70 is pressed against the displacer 80 by the resilient elements 60 and urged away from frame 40. The displacer 80 can move along a rail system parallel to the longitudinal axis T to push the housing 70 in the D direction, so that the support rod 30 also moves along the longitudinal axis T in the D direction as well, thus increasing the spacing between the clamping jaws 12,14 (see FIG. 8).

In a preferred embodiment, the apparatus 10 includes a central control unit (not shown in the Figures) for controlling the displacer 80 and the rotator 82, by means of which the position of the support rod 30 along the longitudinal axis T and the position of the support rod 30 about the longitudinal axis T can be adjusted to the desired value.

With reference to FIGS. 9a-9i, an exemplary operation of the apparatus of the present invention is briefly illustrated, in which the slide 20 is removed from the rack 100. In a first step, the apparatus 10 is moved next to the rack 100 using the 50 robot arms, so that the longitudinal axis T of the support rod 30 is parallel to the short edges 100a of the slide 20 to be moved and so that the slide 20 is located in or slightly above the imaginary plane connecting the prism edges 13, 15 (see FIG. 9a). Thereafter, the support rod 30 is rotated about the longitudinal axis T by the rotator 82 to the second position shown in FIG. 9b. In the next step shown in FIG. 9c, the support rod 30 is moved along its longitudinal axis T in the second direction D by means of the tweezers 52 and displacer 80, whereby the second clamping jaw 12 moves away from the first clamping jaw 14. Thus, the increased distance between the co-acting clamping jaws 12, 14 allows the slide 20 to be inserted between them. In the next step shown in FIGS. 9d and 9e the apparatus 10 is moved towards the rack 100 by the robot arm 50, and the clamping jaw 12 is positioned between the slides 20 in the rack 100 below the slide 20 to be moved. The support rod 30 is pushed in the D direction until the clamping jaw 12 extends beyond the opposite long edge 100b of the slide 20 (see FIG. 9e). The support rod 30 is secured in this position by the displacer 80 and then rotated into the first position by the rotator 82 (see FIG. 9f). Then, the locking of the longitudinal axis T is released and the resilient elements 60 are allowed to move the support rod 30 and the clamping jaw 12 in the P direction. The long edge 100b of the slide 20 abuts between the prismatic jaws of the clamping jaw 12 so that the slide 20 is pulled by the clamping jaw 12 in the P direction (see FIG. 9g). It is noted that the displacer 80 may optionally brake the movement in the P direction to avoid damaging the fragile slide 20. In the case of embodiments without a resilient element 60, the movement in the P direction is performed by the displacer 80. The movement of the clamping jaw 12 in the P direction lasts until the other long edge 100b of the slide abuts between the prismatic jaws of the clamping jaw 14, after which the slide can be moved together with the apparatus 10 to the desired position (see FIGS. 9h and 9i). In this position, a stable fixation of the slide 20 is ensured and the prismatic jaws automatically rotate the plane of the slide 20 into the plane connecting the prism edges 13, 15. This enables the precise transfer of the slides and thus the efficient automation of the digitization workflow.

The resilient elements 60 approach the clamping jaws 12, 14 toward each other with a force of a certain magnitude, so as to ensure that the slide 20 is always fixed with the same force. It is obvious to the person skilled in the art to determine the magnitude of the force acting on the slide 20. In addition to the efficient design of the resilient elements 60, a further advantage is that the slide 20 can be removed by manually releasing the clamping jaws 12, 14 in the event of a power failure.

Various modifications will be apparent to a person skilled in the art without departing from the scope of protection determined by the attached claims.

The invention claimed is:

1. Apparatus for positioning a microscope slide and comprising co-acting first and second clamping jaws adapted to receive and carry a microscope slide and attached to a robot arm;

the first clamping jaw defining an aperture within the first clamping jaw and being fixed to a frame carried by the robot arm;

a support rod slidably mounted to the robot arm, extending through said aperture, and adapted for rotation and back-and-forth movement relative to the first clamping jaw;

the second clamping jaw being mounted to a distal end portion of the support rod; and a support rod drive carried by the robot arm and operably associated with the support rod.

2. The apparatus according to claim 1, wherein the first and second clamping jaws are formed as prismatic jaws with V-shaped legs.

3. The apparatus according to claim 1, wherein the support rod drive comprises a displacer for displacing the support rod along a longitudinal axis and a rotator for rotating the support rod about a longitudinal axis.

4. The apparatus according to claim 1, wherein the first clamping jaw comprises two separate clamping portions defining the aperture therebetween, each of which is a prismatic jaw with V-shaped legs and the support rod extends between the aperture and the clamping portions.

5. The apparatus according to claim 1, wherein the support rod is rotatable 90 degrees between a first position and a second position.

6. The apparatus according to claim 3, wherein the rotator is an electric motor fixed to a proximal end portion opposite the distal end portion of the support rod.

7. The apparatus according to claim 3, wherein the displacer is a rail track displacer.

8. The apparatus according to claim 1, wherein the support rod drive includes a displacer, a housing connected to the displacer, and at least one spring member within the housing adapted to urge the second clamping jaw toward the first clamping jaw.

9. The apparatus according to claim 3, comprising a central control unit for controlling the displacer and the rotator.

10. The apparatus according to claim 1, wherein the first and second clamping jaws and preferably the support rod are made of hard metal, preferably tungsten carbide.

11. The apparatus according to claim 10, wherein said clamping jaws and said support rod are made of tungsten carbide.

* * * * *